United States Patent
Beecroft et al.

(10) Patent No.: US 9,800,499 B2
(45) Date of Patent: Oct. 24, 2017

(54) ETHERNET SWITCH AND METHOD FOR ROUTING ETHERNET DATA PACKETS

(75) Inventors: Jon Beecroft, Bristol (GB); David Charles Hewson, Bristol (GB)

(73) Assignee: Cray UK Limited, Reading (GB)

( * ) Notice: Subject to any disclaimer, the term of this patent is extended or adjusted under 35 U.S.C. 154(b) by 188 days.

(21) Appl. No.: 13/704,206

(22) PCT Filed: Jul. 15, 2011

(86) PCT No.: PCT/GB2011/051331
§ 371 (c)(1),
(2), (4) Date: Feb. 2, 2013

(87) PCT Pub. No.: WO2012/010868
PCT Pub. Date: Jan. 26, 2012

(65) Prior Publication Data
US 2013/0215896 A1   Aug. 22, 2013

(30) Foreign Application Priority Data

Jul. 19, 2010   (GB) .................................. 1012037.6

(51) Int. Cl.
| | |
|---|---|
| H04L 12/701 | (2013.01) |
| H04L 12/741 | (2013.01) |
| H04L 12/46 | (2006.01) |
| H04L 12/709 | (2013.01) |
| H04L 12/947 | (2013.01) |
| H04L 12/931 | (2013.01) |
| H04L 12/721 | (2013.01) |

(52) U.S. Cl.
CPC .......... *H04L 45/74* (2013.01); *H04L 12/4625* (2013.01); *H04L 12/4633* (2013.01); *H04L 45/245* (2013.01); *H04L 45/66* (2013.01); *H04L 49/25* (2013.01); *H04L 49/351* (2013.01); *Y02B 60/33* (2013.01)

(58) Field of Classification Search
None
See application file for complete search history.

(56) References Cited

U.S. PATENT DOCUMENTS

| | | |
|---|---|---|
| 2005/0105538 A1 | 5/2005 | Perera et al. |
| 2005/0238018 A1 | 10/2005 | Devi et al. |
| 2006/0251074 A1 | 11/2006 | Solomon |
| 2007/0053294 A1 | 3/2007 | Ho et al. |
| 2007/0098006 A1 | 5/2007 | Parry et al. |
| 2007/0268915 A1 | 11/2007 | Zelig et al. |

OTHER PUBLICATIONS

Schlansker M. et al.: "Killer Fabrics for Scalable Datacenters", Communications (ICC), 2010 IEEEE International Conference on, IEEE, Piscataway, NJ, USA, May 23, 2010, pp. 1-6.
Miura et al.: "Low-cost High-bandwidth Tree Network for PC Clusters based on Tagged-VLAN technology", Parallel Architectures, Algorithms and Networks, 2005. ISPAN 2005. Proceedings. 8th International Symposium on, Las Vegas, NV, Dec. 7-9, 2005, Piscataway, NJ, USA, IEEE, Los Alamitos, CA, USA, Dec. 7, 2005, pp. 84-93.

*Primary Examiner* — Rhonda Murphy
(74) *Attorney, Agent, or Firm* — Craig J. Lervick; Larkin Hoffman Daly & Lindgren, Ltd.

(57) ABSTRACT

The present invention relates to data switching networks, and, in particular, to link aggregation groups in Ethernet switching networks. A technique is described in which a large number of links in a link aggregation group can be managed.

26 Claims, 7 Drawing Sheets

ETHERNET SWITCH AND METHOD FOR ROUTING ETHERNET DATA PACKETS

The present invention relates to data switching networks, and, in particular, to link aggregation groups in Ethernet switching networks.

BACKGROUND OF THE PRESENT INVENTION

Data switching networks are used to route data items between devices, for example between servers in data centres. Ethernet is a frame-based networking technique primarily used for local area networks (LANs). A typical Ethernet switching network includes one or more Ethernet bridges that house switching elements for routing data between a plurality of data ingress ports and a plurality of data egress ports.

Figure 1:
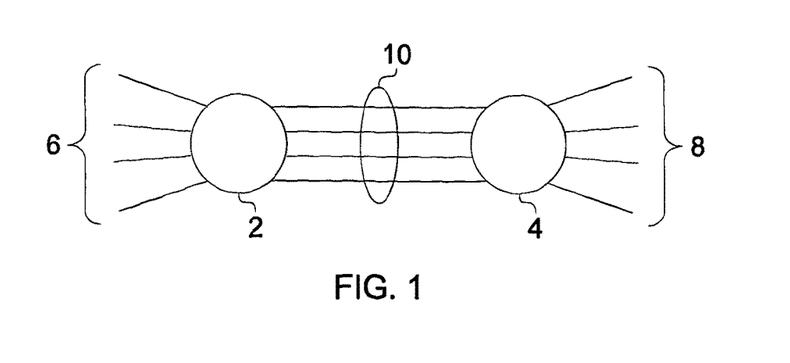
FIG. 1 illustrates a LAG in an Ethernet data switching network.

A Link Aggregation Group (LAG) is a collection of physical network links brought together to provide a single logical channel of higher bandwidth. The Link Aggregation Control Protocol (LACP) is part of the IEEE specification 802.3ad. FIG. 1 of the accompanying drawings shows a typical Ethernet LAG. First and second Ethernet bridges 2 and 4 are connected by Ethernet links 10. The first bridge 2 has a plurality of data ingress/egress ports 6, and the second bridge 4 has a plurality of data ingress/egress ports 8. In this simplified example, the LAG has four links 10 connecting the two Ethernet bridges 2 and 4 providing up to 4 times the bandwidth of a single link. The LACP allows a network device connected to an ingress/egress port of a bridge to negotiate an automatic bundling of links by sending LACP management frames to the peer. LACP works by sending frames (LACPDUs) down all links that have the protocol enabled. If a device is present on the other end of the link that also has LACP enabled, it will also independently send frames along the same links enabling the two units to detect multiple links between themselves and then combine them into a single logical link. LACP can be configured in one of two modes: Active or Passive. In Active mode it will always send frames along the configured links. In passive mode however, it acts as "speak when spoken to", and therefore can be used as a way of controlling accidental loops (as long as the other device is in active mode). Link aggregation presents a number of problems for Ethernet-based communications. Ethernet networks use a defined protocol to determine the spanning tree of the network and disable any links that offer alternate paths to a destination. This ensures there is only one route from a source to a destination. Additionally, there is only one source to destination connection for network traffic that uses an Ethernet LAG. This means that a particular source to destination connection will always use the same link within the LAG. A LAG uses a distribution algorithm based upon source and/or destination network addresses of the connected devices to define the connections to be made on the individual Ethernet links that form the LAG. Typically a number of different distribution algorithms are available to a network administrator. The network administrator will choose the algorithm that gives the most even distribution of network traffic across the LAG depending upon a number of pre-determined, site specific parameters.

The distribution algorithm is normally based on either the source or destination MAC addresses or a combination of both the source and the destination MAC addresses to select an Ethernet link within the LAG for the Ethernet frame to be delivered on. Other distribution algorithms may use the IP address and port numbers of the layer 3 protocol.

Having a single route or path for the packets to follow does simplify a number of issues. Ethernet packets should be delivered in order. Having a single route from source to destination guarantees that one packet cannot overtake another. This greatly improves the performance of higher-level protocols. Ethernet is normally the data link layer for TCP/IP and UDP/IP. TCP can receive IP packets in a different order from the order they were sent but this requires a significant processing and buffering overhead at the receiving node.

However, the simplification of a single route also means that the packet load, over the LAG, can be very unbalanced. Full utilization of the LAG requires all links to be transmitting data. This in turn requires a number of communications to occur concurrently with routes that send the data along different links of the LAG. The probability of better utilization increases with the number of different conversations being relayed across the LAG. The greater the number of links in the LAG then the greater the number of conversations are needed to keep all the links of the LAG active.

Figure 2:
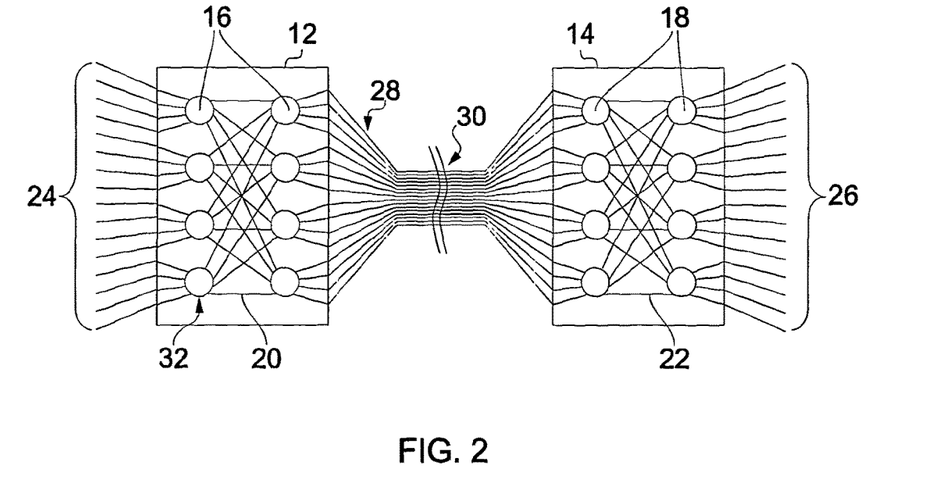
FIGS. 2 and 3 illustrate respective Ethernet data switching networks.

A distribution algorithm is required to implement a LAG. This will select the link that is used to relay a packet across the LAG. This has to be executed at the same time that the MAC tables are accessed to perform the MAC address to destination port translation. This usually restricts the width of the LAG to a proportion (no more than half) of the links on the Ethernet switch chip. The physical implementation of an Ethernet switch usually puts an upper limit on this number. FIG. 2 of the accompanying drawings gives an example of a multi-switch LAG. Having first and second Ethernet bridges 12 and 14, each of which has two layers of internal switching, provided by respective pluralities of switches 16 and 18, interconnected by internal links 20 and 22 respectively. Each bridge 12, 14 has a plurality of ingress/egress ports 24, 26 through which data passes for routing by the switches 16 and 18. The bridges 12, 14 are connected to one another by a plurality of Ethernet links 28 over which data is passed. These Ethernet links are arranged into a LAG 30, in order to provide an effective increase in bandwidth between the bridges 12 and 14.

The example shows each Ethernet bridge having two layers of switching. However, the method works equally well with many more layers of switching and also with switch chips with many more ports per switch than the 8 shown per switch in the Figure. The internal topology used in FIG. 2 is also an example and the method works equally well with other topologies.

In the example of FIG. 2, all of the Ethernet links 28 of the switching elements 16, 18 next to the LAG are used within the LAG. This is a configuration that could be made to work but it is restrictive to a network administrator to impose this structure for a number of reasons:

1. The physical locations of the cables may not conveniently reach these ports or a non LAG Ethernet link may be required from one or more of the ports located in the natural range of the LAG ports. 10 Gbps Ethernet copper cables have a relatively short reach and this can impose additional physical constraints.

2. The requirements of the LAG may change over time and additional ports may need to be added or removed.

3. Individual links of the LAG may fail and additional links may need to be added to cover the extra load or the distribution of traffic on the other links may need to be changed to cover the traffic that was using the failing link.

Figure 3:
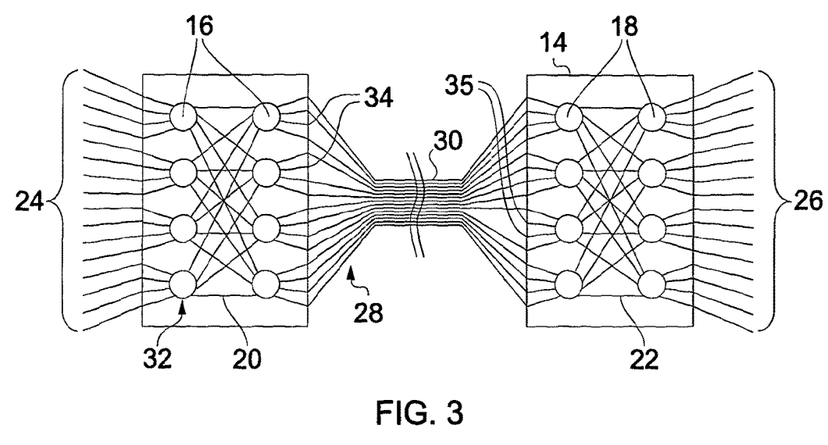

FIG. 3 of the accompanying drawings gives an example of a multi-switch LAG which is similar to the example shown in FIG. 2. In the FIG. 3 example, however, some of the links 34 within the range of LAG 30 are assigned as normal Ethernet bridge links outside of the LAG 30.

Ethernet LAGs are typically limited to a small number of Ethernet Links, perhaps 4 or 8. At the time of writing the maximum available 10 GbE links in a LAG was 16.

SUMMARY OF THE INVENTION

According to one aspect of the present invention, there is provided an Ethernet switch for routing Ethernet data packets, the switch comprising a data ingress port, a plurality of data egress ports, network fabric connecting the data ingress port with the data egress ports, and comprising a plurality of interconnected switching elements, an encapsulator connected for reception of an incoming data packet from the ingress port, and operable to generate an internal data packet comprising a header portion and a payload portion, the header portion including routing information relating to a route through the interconnected switching elements, and derived from routing information of an incoming data packet, and the payload portion comprising that incoming data packet, wherein the encapsulator is also operable to determine whether the routing information of the incoming data packet relates to a LAG having multiple links associated therewith, and, if so, to generate LAG information for inclusion in the header of the internal data packet, and wherein the LAG information includes a distribution value for use in determining selection of one of the links associated with the LAG for routing of the data packet concerned.

According to another aspect of the present invention, there is provided a method of routing Ethernet data packets in an Ethernet switch having a data ingress port, a plurality of data egress ports, and network fabric connecting the data ingress port with the data egress ports, and comprising a plurality of interconnected switching elements, the method comprising the steps of receiving an incoming data packet, generating an internal data packet which includes a header portion and a payload portion, the header portion including routing information relating to a route through the interconnected switching elements, and derived from routing information of an incoming data packet, and the payload portion comprising that incoming data packet, determining whether the routing information of the incoming data packet relates to a LAG having multiple egress ports associated therewith, and, if so, generating LAG information for inclusion in the header of the internal data packet, wherein the LAG information includes a distribution value for use in determining selection of one of the egress ports associated with the LAG for routing of the data packet concerned, routing the internal data packet through the network fabric using the routing information, and routing the incoming data packet to the egress port determined by the LAG information.

Such a technique enables LAG to be managed across a large network fabric.

In one embodiment, LAG information is generated only once, upon entry to the switch, for a particular incoming data packet. This reduces the amount of processing time required to route the internal data packet through the switch fabric.

In another embodiment, the encapsulator is operable to determine a LAG algorithm from the routing information of an incoming data packet, and to use such a determined LAG algorithm to generate the distribution value for the data packet concerned. This allows different distribution algorithms to be used for different packets, and so the most appropriate distribution of data packets to a LAG for the data packet type concerned can be utilised.

Each switching element of the network fabric may include storage means operable to store output information indicative of an output route from the switching element concerned, the switching element being operable to access stored output information in dependence upon received LAG information. The encapsulator may then be operable to determine a LAG width value from the routing information of the incoming data packet, the width value being indicative of an amount of LAG information to be used for accessing stored output information. Each switching element may also include weighted distribution logic operable to produce an output port selection signal in dependence upon retrieved output information.

In one embodiment, each switching element includes a data packet filter which is operable to discard data packets in dependence upon the distribution value associated therewith.

Embodiments of the invention serve to provide techniques that allow Ethernet links to be aggregated to any width.

According to another aspect of the present invention, there is provided an Ethernet switch for routing Ethernet data packets, the switch comprising a data ingress port, a plurality of data egress ports having respective output links, and network fabric connecting the data ingress port with the data egress ports, and comprising a plurality of interconnected switching elements, the ingress port being connected to each of the output ports via a plurality of switching elements, wherein each of a plurality of the switching elements includes a packet processor connected for reception of an incoming data packet, and operable to determine whether routing information contained in the incoming data packet relates to a LAG having multiple output links associated therewith, and, if so, to route the data packet towards one of the output links associated with the LAG.

Each switching element may include a packet processor connected for reception of an incoming data packet, and operable to determine whether routing information contained in the incoming data packet relates to a LAG having multiple output links associated therewith, and, if so, to route the data packet towards one of the output links associated with the LAG.

According to another aspect of the present invention, there is provided a method of routing Ethernet data packets in an Ethernet switch having a data ingress port, a plurality of data egress ports having respective output links, and network fabric connecting the data ingress port with the data egress ports, and comprising a plurality of interconnected switching elements, the ingress port being connected to each of the output ports via a plurality of switching elements, the method comprising the steps of, in each of a plurality of the switching elements, receiving an incoming data packet, determining whether routing information contained in the incoming data packet relates to a LAG having multiple egress ports associated therewith, and, if so, routing the incoming data packet to one of the output links associated with the LAG.

Such a method may include the steps of, at each switching element receiving an incoming data packet, determining whether routing information contained in the incoming data packet relates to a LAG having multiple egress ports associated therewith, and, if so, routing the incoming data packet towards one of the output links associated with the LAG.

Embodiments of such aspects of the present invention can thereby apply the techniques of the first and second aspects to unencapsulated data packets.

DETAILED DESCRIPTION OF THE PREFERRED EMBODIMENTS

Figure 4:
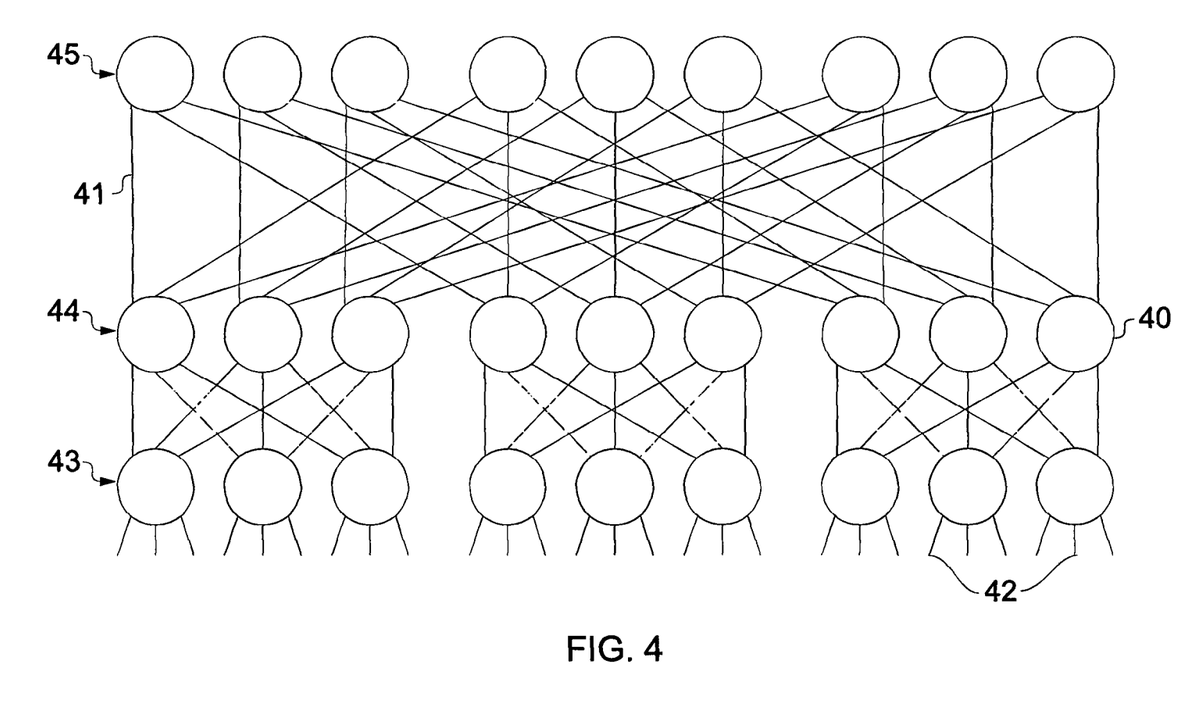
FIG. 4 illustrates a data switching topology.

FIG. 4 of the accompanying drawings illustrates an example of a "Fat Tree" network, sometimes referred to as a "Clos" network. Such a network is suitable for use as the internal network of the Ethernet bridges 12 and 14 of FIGS. 2 and 3. The Fat Tree network of FIG. 4 will be used to describe the operation of a wide LAG mechanism embodying the present invention. However, any network topology could be used to implement such mechanism and the Fat Tree is only used in this context as a convenient example.

The internal network of FIG. 4 comprises a plurality of switching elements 40 which are interconnected by a plurality of links 41. The switching elements are arranged in three hierarchical levels 43, 44 and 45. Switching elements in the first level 43 provide data ingress and egress ports 42 for the internal network. In the example of FIG. 4, the switching elements 40 in the first and second levels 43 and 44 are divided into three groups, and within each group, each of the switching elements 40 in the first level 43 are connected with each of the elements 40 in the second level 44. The switching elements 40 in the third level 45 are each connected with one switching element from each of the three groups in the second level 44. Such a topology maintains total cross sectional bandwidth and provides multiple routes from each ingress port to each egress port 42.

A Fat Tree communication is performed by moving up the tree from one of the ingress ports 42 to a point high enough in the internal network to give visibility of a required egress port. If the communication was for a neighbouring port on a switching element, the connection could be made without using any additional switching elements. For slightly more distant ports the packet could be routed up one level of the network before turning back down to visit the switching element with the final egress port 42. In this case the packet would traverse 3 switching elements 40. For distant ports the internal data packets may have to pass up through a number of switching elements 40 before turning back down the network towards the required egress port 42.

Fat Tree networks have the property of only needing an absolute route path on the way down the network. Any upward route can be used and the same downward route will end up at the correct egress port. This can be useful in networks employing adaptive routing as the adaptive choice can be very general and does not need to be specific to particular egress ports. An adaptive route can respond to the current network load and can direct traffic away from congested links.

Ethernet LAGs must also correctly support floods, broadcasts and multicast operations. Ethernet flood is the mechanism used to route packets to the correct destination when the route to the destination has not yet been learned by the MAC address translation tables. When an Ethernet frame is flooded it is directed to all the egress ports of the bridge except the port it arrived on. This process can be repeated on any subsequent Ethernet bridges that are connected to a bridge. Eventually, if the destination MAC address is valid and it is connected to the Ethernet network the packet should arrive at the correct final destination. Any other destinations that the packet arrives at that are not valid will simply discard the packet. A broadcast has a special MAC address value that indicates the packet should be sent to all destinations. A broadcast will also direct the packet to all bridge egress ports except the one associated with the ingress port the packet arrived on. Multicast packets are sent to a subset of all the egress ports (again excluding the ingress port).

Floods, broadcasts and multicasts must all work with LAGs. A LAG is a single logical link and so only one packet should appear on one of the links within the LAG for floods, broadcasts and multicasts. For a flood the packet should appear on the same link it would have appeared on if the packet had not been flooded. This is required to guarantee the order of a packet stream as the first packet may be flooded but the second packet may become a normal unicast packet if the destination becomes learned between the two packets.

Each switching element 40 that provides an ingress port 42 for the internal network includes an encapsulator. The encapsulator is operable to encapsulate incoming Ethernet frames into an internal data packet when they are received at the ingress port. Each internal data packet has a header, a body that contains an unaltered Ethernet frame and a checksum value to test the integrity of the Ethernet frame data.

The destination MAC address of the incoming Ethernet frame is translated, and it is determined whether a network wide-Ethernet LAG egress port is to be used for routing of the data packet from the internal network, and hence from the Ethernet bridge. The translation returns a network route value identifying a wide LAG and this is added to the header of the internal data packet.

A LAG distribution value is then determined by the encapsulator, and added to the internal data packet header. The encapsulation of the incoming data packet and the determination of the header information are performed once on entry to the Ethernet bridge internal network.

The translation of the incoming data packet destination MAC-address can also return a LAG algorithm value and this can be used to identify the function to use to generate the LAG distribution value. Possible LAG algorithms can use the source MAC address, the destination MAC address, a combination of the source and destination MAC address or any other values that may be included as part of the Ethernet frame header. These could include values from a layer 3 IP header if it exists. If an IP header is available then combinations of the source, destination IP numbers and even the IP port addresses are all good candidates for generating a LAG distribution value. A good LAG distribution value should have an even distribution of all the possible values giving roughly the same number of each of the output values for a range of input values. In particular it should not favour or cluster around any values anywhere within the full range of the distribution value. A cyclic redundancy check (CRC) function is potentially a good mechanism for forming the distributor value and the example implementation described in detail uses a CRC-16-CCITT coding.

The translation of the incoming data packet destination MAC address can also return a LAG size value. This value can be used to improve the resolution or distribution of very wide LAGs. This is described in more detail below.

Once the internal data packet header is fully formed, the encapsulated Ethernet frame is routed into the internal network as an internal network data packet. The network route value identifies that the packet is to be routed using a wide LAG. The LAG distribution value is then used as an interval route value. In one example, the LAG distribution value range is divided equally between all of the egress ports used to form the LAG. For example, in a 16 bit distributor range from 0-65535, if there were 97 ports used to form the wide LAG then the number of LAG values assigned to each egress port in the LAG is 65536/97=675.63. In practice some ports will be programmed to take 675 values of the LAG distribution value while others take 676. So in this example port 0 of the LAG would take all packets with a LAG distribution value in the range 0 to 675, port 1 would take packets with a distributor in the range 676 to 1351, port 2 in the range 1352 to 2026 and so on up to port 96 that takes values in the range 64861 to 65535. For this example the maximum possible resolution of the LAG distribution value has been described. This requires all of the bits of the LAG distribution value to be used to direct the packet to the appropriate egress port of the LAG. With medium sized LAGs this very detailed resolution is not always necessary.

Figure 5:
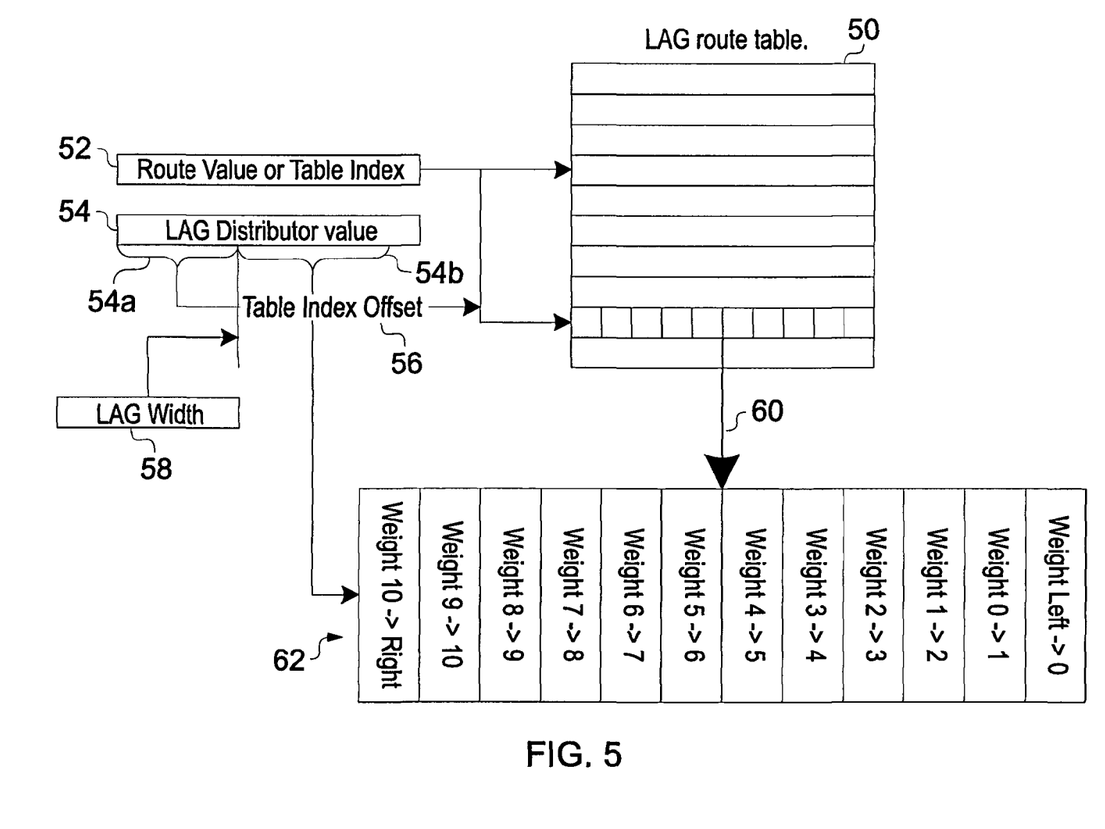
FIGS. 5 to 8 illustrate data switching embodying an aspect of the present invention.

The internal data packet traverses the internal network and at each stage in the network the packet's route value is used as an index 52 (FIG. 5) into a table 50 (FIG. 5) that is available on each switching element 40. FIG. 5 illustrates the table 50, which could be implemented as a RAM but other storage mechanisms could be used instead. A value 60 returned from the table 50 describes how the LAG distribution value 54 should be interpreted at this stage in the network. A typical implementation might use a RAM with perhaps 72 bits of state or some similar width although any width could be used and would provide a different set of tradeoffs. It is quite possible that multiple formats might be used, selected using a type field, and this would give greater flexibility and control over different switching element configurations. 72 bits is a limited amount of information to direct the packet to the appropriate switch output. A LAG width value 58, returned on the MAC address translation, can be used to increase the available information returned from the RAM. The LAG width value 58 can be used to select some of the bits of the LAG distribution value 54 to be included in the table index formed from the header route value 52. In this way a single very wide LAG, requiring detailed resolution from the LAG distribution value, will be represented over many table entries. For example, a very wide LAG could take 7 bits of the LAG distribution value 54 and use 128 entries in the table 50. This would give 128×72=9216 bits of state and provide a detailed description of the boundaries of the LAG distribution value 54 from one egress port in the LAG to the next egress port in the LAG. FIG. 5 shows how the full table index is formed, and illustrates how the LAG width value 58 is used to select a portion 54*a* of the LAG distribution value 54 and how the route value 52 that forms the base for the table index is modified by the selected portion 54*a* of the LAG distribution value 54. In the example, an addition 56 to the route value 52 is used to form the full RAM address but any function that provides a unique RAM address using the route value 52 and the selected portion 54*a* of the LAG distribution value 54 would be equally valid. Very wide LAGs will use a large portion of the total network resources and as such it is reasonable that a large proportion of the LAG table is used to describe a detailed division of the LAG distribution value. A narrow LAG will use a much smaller proportion of the total network resources and so it would be reasonable that a proportional amount of the LAG table is used to describe the LAG routing. Being a narrow LAG also means that a smaller total amount of table is necessary to give a reasonable distribution of packets over the whole LAG links range.

Figure 6:
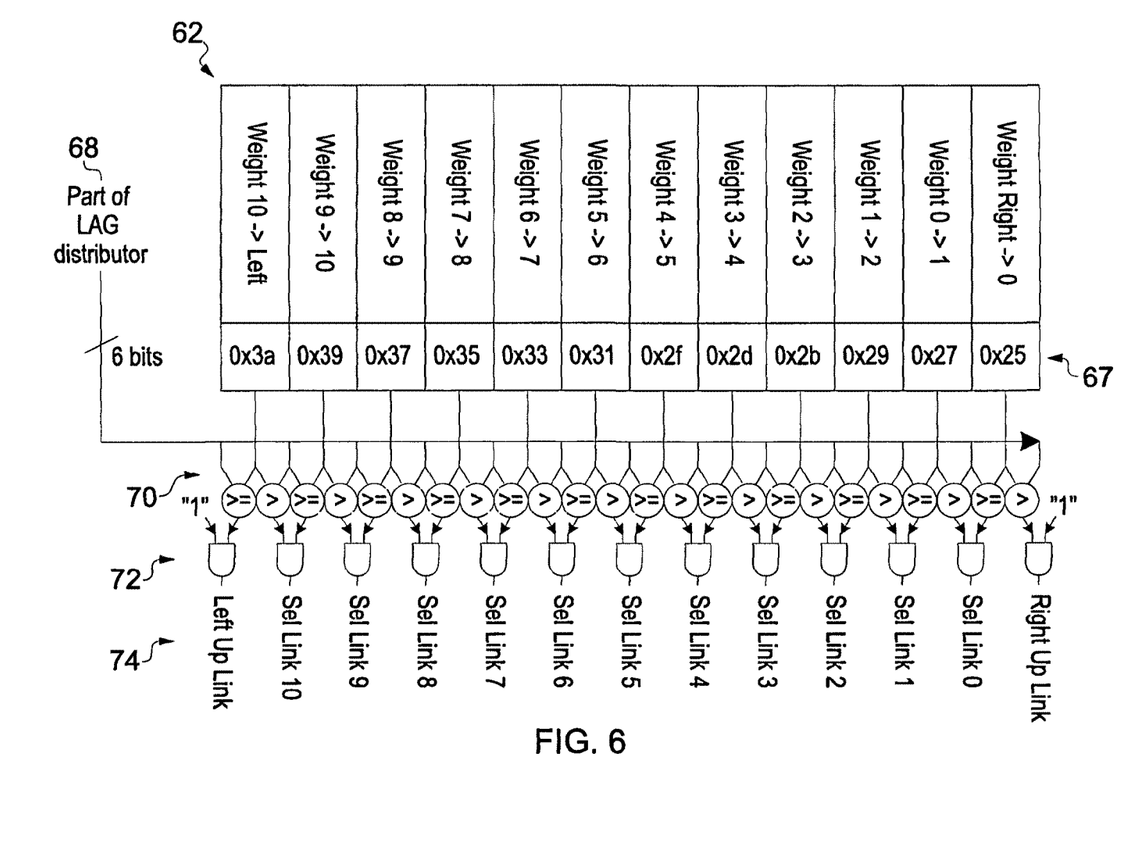

Having formed the full RAM/table address, a value 60 is read and used to interpret the other portion 54*b* of the LAG distribution value 54 identified from the LAG width value 58 as shown in FIG. 5. This other portion 54*b* is passed to weighted distribution logic 61, as shown in FIG. 6. This weighted distribution logic generates select signals 74 that are used to identify the switching element output ports the internal data packet should be directed towards at the next stage of the internal network. In the example logic of FIG. 6, 13 select lines 74 are generated from 12×6 bit fields of the 72 bit table output 67. In this example, 6 bits 54*b* of the LAG distribution value 54 are used to interpret the 72 bit number from the table 50.

Figure 7:
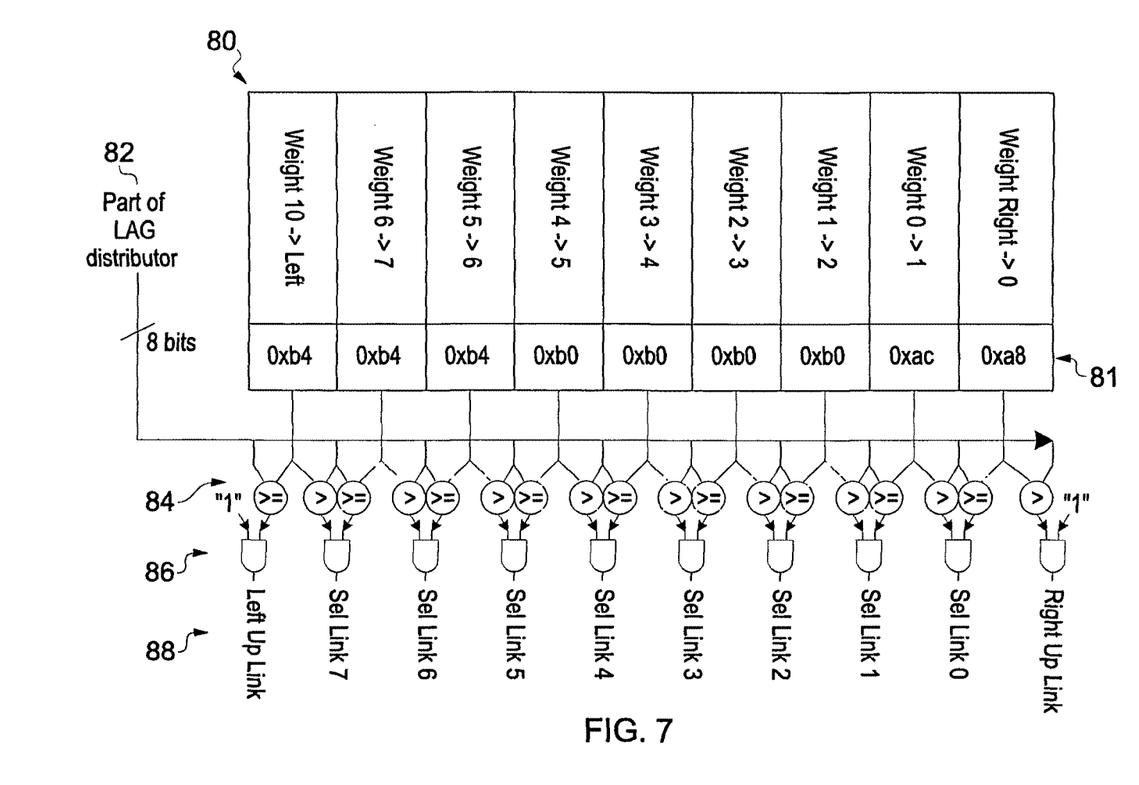

FIG. 7 shows another possible configuration of weighted distribution logic. In this example, 8 bits 54*b* of the LAG distribution value 54 are compared against 9 fields of the 72 bit example read value generating 10 output port select lines 88. FIGS. 6 and 7 have respective examples of possible values of the table entry. Each example has a left and right select signal as well as 11 port select signals 74 for FIG. 6, and 8 port select signals 88 for FIG. 7. The left and right values are an optimisation for use in networks like the Fat Tree network where these values would be assigned to adaptive up routes but they could be used for any network topology where multiple hops are required to reach the egress port. However, the left and right values could always select the same output port and do not need to generate an adaptive route.

The read data returned from the table is divided into a number of fields. These fields mark the boundary between portions of the LAG distribution value 54. Each select signal 74;88 has 2 comparator functions 70,72;84,86 that allow the signal to be asserted when the LAG distribution value 54 is greater than or equal to the value on the right and less than the value on the left. Each field within the value 60 read from the table should be greater or equal to the field value to the right. In this way, only one select signal can be asserted for any given LAG value input into the logic. FIG. 6 illustrates an example where all the field values are different from each other. In this example, a LAG distribution value 54 of 0x28 would select link 1 and a value of 0x05 would select Right Up Link. FIG. 7 illustrates a different example. In this case, the 9 fields from the table are each 8 bits wide. Some of the fields have been programmed with the same value. This prevents the select signals that appear between identical values from being asserted for any value from the LAG distribution value 54. This allows links that appear within the range of a continuous wide LAG to be excluded from being part of that LAG.

The mechanism as described allows a mix of any of the selected signals for a range of LAG distribution values 54. There are some occasions where all the LAG traffic for all values of the LAG distribution values 54 should be directed to a single port. In this case, another special coding value can be used that breaks the normal rule of the fields always having a greater or equal value when moving from the right most field to the left most field. One possible coding is to use the maximum value on in the right field followed by one less than the maximum value in the field to the left of the right most field. If this is detected then any of the other field values could be used to identify a single output port to direct all the packets towards.

Another special case that each of the select values needs to cope with is where an output should be selected for only the maximum value supplied from the LAG distribution value 54. For this special case a value of zero fed into the greater than comparator should be interpreted as 1 greater than the maximum value if the value on the right of the zero field is not zero. Then an output signal is asserted for this select signal if the LAG distribution value 54 into the weighted distribution logic has the maximum value.

Such a weighted routing mechanism is applied at each switching element 40 within the internal network. For the Fat Tree example the initial stages of the internal network would normally be configured always to generate a single upward value unless some of the LAG ports appear on the first network element.

Figure 8:
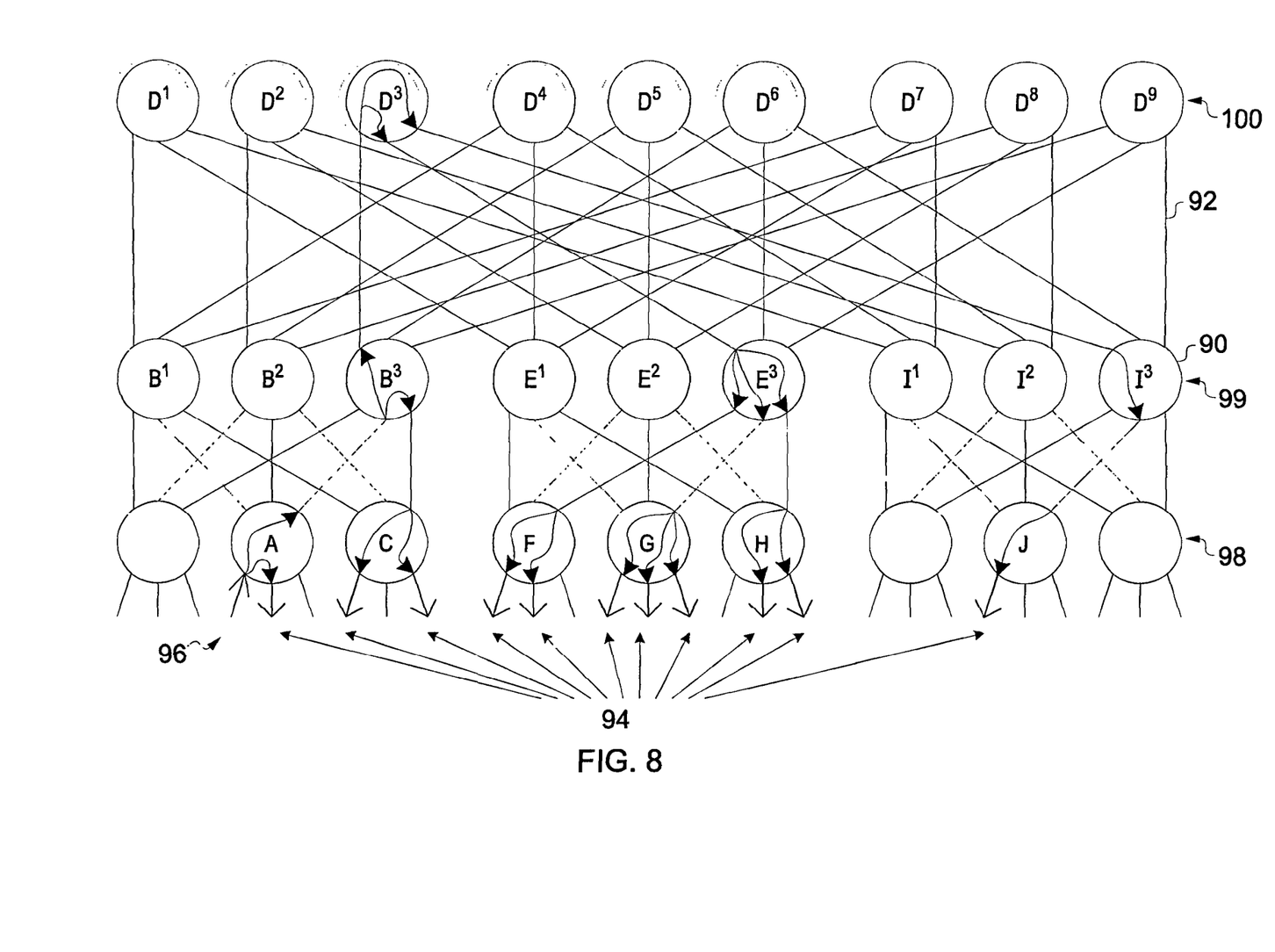

FIG. 8 gives an example Fat Tree network with an example LAG mapped onto some of the ports. The structure of the network of FIG. 8 is similar to that of FIG. 4, and comprises three levels 98, 99, 100 of switching elements 90 interconnected by internal network links 92. In FIG. 8 the LAG ports appear on switching elements A, C, F, G, H and J. The example shows an incoming data packet arriving on a port of switching element A. Being a packet connected directly to a true Ethernet link the frame is first encapsulated into an internal data packet. The destination MAC address of the incoming data packet is translated and, for this packet, a route to the example wide LAG is returned. The LAG distribution value 54 is generated according to the type of algorithm to be used returned with the translation. The route value 52 and the LAG distribution value 54 are put into the header of the resulting internal data packet, which is then passed on for routing. In this example LAG there are 11 ports. This means the LAG distribution space must be divided into 11 roughly equal segments to provide an even distribution of data packets to all of the links in the LAG. In switching element A $1/11$ths worth of LAG data packets should be directed to the local link. The other $10/11$ths worth should be sent upwards. As a Fat Tree is used in the example the upward route could be any of the upward links and the $10/11$ths worth selection could specify an adaptive selection of any of the upward links. In FIG. 8, the choice is the link directing the packet to switching element B3 but switching element B1 or B2 could have been used. When the internal data packet arrives at switching element B3 another table lookup is required. However, no MAC address translation to distribution value is needed as this is already available in the header of the internal data packet. At this switch $8/11$ths worth should be sent upwards, $2/11$ths worth should be sent to switching element C and $1/11$ths worth should be sent to switching element A. The $1/11$ths worth that would be directed to switching element A use exactly the same values of the LAG distributor that would have caused the packet to be directed to the local link on switching element A. This means that no packet will ever retrace the path that has already been used because the values of the LAG distributor that caused the packet to take this link in one direction should never include a value that would route back along the same link in the other direction. It also means that the same table can be used for all the ports of a particular switching element. For the example in FIG. 8 the tables in B1, B2 and B3 are loaded with the same values as they would respond in the same way to LAG packets arriving at their ports. If the LAG distribution value indicates the packet should move up the network then again an adaptive choice could be made allowing the packet to arrive at any of the top switching elements D1 to D9. The packet will then follow the same rules until it appears at the correct LAG port as described by the LAG distribution value. With this mechanism and any given route value and LAG distribution value, the packet will be routed to the correct LAG port from any position within the whole network.

Flood, broadcast and multicast packets must also be correctly routed to only one port of the LAG. Each switching element output is given a LAG distribution value filter. The switching element output prepares data for transmission on a link. It does this for both internal links and Ethernet Bridge egress ports. The Ethernet Bridge egress ports connected to the external network also perform the un-encapsulation function removing the header that had been added by the Ethernet ingress port. The LAG distribution value filter consists of two registers that hold the upper and lower limits of acceptable LAG distribution values that can be sent for this output port. If a LAG distribution value is less than the lower limit or is higher than the upper limit then the internal data packet must be discarded. If the link is not an egress port of the Ethernet Bridge this is normally set to include all packets by setting the lower value to 0 and the upper value to the maximum value. If the output port is an egress port of the Bridge and has been assigned as one of the links in a wide LAG then the filter is set to the minimum and maximum values of the LAG distribution values that would normally direct packets to this link. Any internal data packets arriving at this link with the wrong value of the LAG distribution value are discarded. This means broadcasts and multicasts can send their packets to all the ports in the LAG and the Ethernet Frame will only be transmitted on the correct egress port. This gives the right function but it is inefficient as packets are transmitted on internal links that will only be discarded at the output egress port. If all the Ethernet egress ports beneath an internal network element are part of the same LAG then the LAG filter for the internal output link can be set to include the inclusive range of all those LAG ports. The link from E to G in FIG. 8 is an example of this. In this case the output ports on E1 to E3 connected to G could set their output filters to only allow broadcast and multicast packets to be transmitted with a LAG distribution value valid for the LAG links connected to switching element G. Flood packets are different in that they are only generated when a MAC translation for a destination MAC address has not been learned in the MAC translation tables. This creates a problem because part of the returned translation includes the method for generating the LAG distribution value. The solution is to mark flood packets with a bit in the header for the internal encapsulation and to prevent any LAG filtering until the packets are received at the final Ethernet egress port. These ports "know" the correct distribution algorithm that should be applied and this can be recalculated using the values in the Ethernet frame that is about to be transmitted. A separate filter can then discard the packet if necessary.

The configuration of a LAG is not likely to change frequently but occasionally links within the LAG may become broken or repaired and occasionally the LAG may be reconfigured to match new bandwidth requirements. It should be possible to make changes to the LAG without breaking other communications that could be occurring on other links within the Bridge. This is especially important if the bridge has a large number of ports. It should be possible to continue to use the LAG even during a reconfiguration. The reconfiguration will need to reassign the range of LAG distribution values each port within the LAG would expect to receive. In a large distributed system, perhaps with thousands of separate switching elements, it is impossible to update all the state of a wide LAG either atomically or simultaneously. An update of all the state could take seconds, and each link can typically transmit up to 80 million packets per second. To allow the update to take place both the old and the new configuration must be available at the same time. This means that the new state can be assembled across the whole switching network before the transition to the new configuration takes place. The internal data packet header may then include another bit that is set for multicast packets. The bit selects between the "A" and "B" register set defining the necessary LAG packet filtering. A configuration bit is then provided in each Ethernet ingress port that can be set to either A or B. When all the LAG register sets are updated with the new configuration then all the A or B configuration select bits can be changed so that the multicast, flood and broadcast operations will use the new settings. All the LAG routing tables can be loaded with a new set of LAG weighted distribution values without disturbing the old values. So switching to the new LAG configuration for LAG packets will occur when the MAC address translation tables are updated with the new route value for the LAG. Once the new settings have had enough time to completely take effect the old route tables can be reused for other new LAG entries.

Embodiments of the present invention have been described using encapsulated data packets (the internal data packets). However, it will be readily appreciated that such techniques can be applied to unencapsulated data packets, in which case each switching element will include processing functionality that examines routing information in each data packet, and then uses that information to route the data packet to a port associated with the LAG.

The invention claimed is:

1. An Ethernet switch for routing Ethernet data packets, the switch comprising:
 a data ingress port;
 a plurality of data egress ports;
 network fabric connecting the data ingress port with the data egress ports, and comprising a plurality of interconnected switching elements;
 an encapsulator connected for reception of an incoming data packet from the ingress port, and configured to generate an internal data packet comprising a header portion and a payload portion, the header portion including routing information relating to a route through the interconnected switching elements, and derived from routing information of an incoming data packet, and the payload portion comprising that incoming data packet,
 wherein the encapsulator is also configured to determine whether the routing information of the incoming data packet relates to a link aggregation group having multiple links associated therewith, and, if so, to generate link aggregation group information including a network route value for inclusion in the header of the internal data packet,
 wherein the encapsulator is further configured to select a link aggregation group algorithm based upon the routing information, the selected link aggregation group algorithm selected from a plurality of possible algorithms, the encapsulator subsequently using the selected link aggregation group algorithm to determine a distribution value and add the distribution value to the header of the internal data packet, the distribution value providing a preferred distribution across the egress ports used to form the link aggregation group, and
 wherein the distribution value is thus used for determining selection of one of the links associated with the link aggregation group for routing of the data packet concerned.

2. An Ethernet switch as claimed in claim 1, wherein such link aggregation group information is generated only once, upon entry to the switch, for a particular incoming data packet.

3. An Ethernet switch as claimed in claim 1, wherein each switching element of the network fabric includes storage means configured to store output information indicative of an output route from the switching element concerned, the switching element being configured to access stored output information in dependence upon received link aggregation group information.

4. An Ethernet switch as claimed in claim 3, wherein the encapsulator is configured to determine a link aggregation group width value from the routing information of the incoming data packet, the width value being indicative of an amount of link aggregation group information to be used for accessing stored output information.

5. An Ethernet switch as claimed in claim 4, wherein each switching element includes weighted distribution logic configured to produce an output port selection signal in dependence upon retrieved output information.

6. An Ethernet switch as claimed in claim 3, wherein each switching element includes a data packet filter which is configured to discard data packets in dependence upon the distribution value associated therewith.

7. The Ethernet switch of claim 1, wherein the encapsulator will generate a link aggregation algorithm value indicative of the link aggregation group algorithm to be used.

8. The Ethernet switch of claim 7 wherein the link aggregation group algorithm will use at least one of a source MAC address, a destination MAC address, a combination of the source MAC address and the Destination MAC address, a source IP number, a destination IP number or an IP port address to generate the distribution value.

9. The Ethernet switch of claim 1, wherein the encapsulator is configured to generate a link aggregation group algorithm value based upon the routing information, and wherein this link aggregation group algorithm value is then used to select a link aggregation group algorithm for use in determining the distribution value.

10. A method of routing Ethernet data packets in an Ethernet switch having a data ingress port, a plurality of data egress ports, and network fabric connecting the data ingress port with the data egress ports, and comprising a plurality of interconnected switching elements, the method comprising the steps of:
 receiving an incoming data packet;
 generating an internal data packet which includes a header portion and a payload portion, the header portion including routing information relating to a route through the interconnected switching elements, and derived from routing information of an incoming data packet, and the payload portion comprising that incoming data packet,
 determining whether the routing information of the incoming data packet relates to a link aggregation group having multiple egress ports associated therewith, and, if so, generating link aggregation group information for inclusion in the header of the internal data packet, wherein the link aggregation group information includes a network route value and a distribution value for use in determining selection of one of the egress ports associated with the link aggregation group for routing of the data packet concerned, and wherein the distribution value for the data packet concerned is determined by first selecting a link aggregation group algorithm from a plurality of possible algorithms for use by the encapsulator in determining the egress port, the selection of the link aggregation group algorithm based upon the routing information of the incoming data packet, and subsequently using the selected ling aggregate group algorithm to determine the distribution value which is then added to the header of the internal data packet header, and which provides a preferred distribution across the egress ports used to form the link aggregation group, routing the internal data packet through the network fabric using the routing information, and, routing the incoming data packet to the egress port determined by the link aggregation group information.

11. A method as claimed in claim 10, wherein such link aggregation group information is generated only once, upon entry to the switch, for a particular incoming data packet.

12. A method as claimed in claim 10, wherein each switching element of the network fabric includes storage means configured to store output information indicative of an output route from the switching element concerned, and wherein the method further comprises accessing stored output information in dependence upon received link aggregation group information.

13. A method as claimed in claim 12, further comprising determining a link aggregation group width value from the routing information of the incoming data packet, the width value being indicative of an amount of link aggregation group information to be used for accessing stored output information.

14. A method as claimed in claim 13, further comprising producing an output port selection signal in dependence upon retrieved output information and weighted distribution logic.

15. A method as claimed in claim 12, further comprising discarding data packets in dependence upon the distribution value associated therewith.

16. The method of claim 10 wherein the routing information of the incoming data packet is further used to generate a link aggregation algorithm value which is then used to select the link aggregation group algorithm.

17. The method of claim 16, wherein the used link aggregation group algorithm will use at least one of a source MAC address, a destination MAC address, a combination of the source MAC address and the Destination MAC address, a source IP number, a destination IP number or an IP port address to generate the distribution value.

18. The method of claim 10 wherein generating a link aggregation group information comprises determining a link aggregation group algorithm value based upon the routing information, and wherein the link aggregation group algorithm value is used to select a link aggregation group algorithm from a plurality of possible algorithms.

19. An Ethernet switch for routing Ethernet data packets, the switch comprising:
a data ingress port;
a plurality of data egress ports having respective output links; and
network fabric connecting the data ingress port with the data egress ports, and comprising a plurality of interconnected switching elements, the ingress port being connected to each of the output ports via a plurality of switching elements,
wherein each of a plurality of the switching elements includes a respective packet processor connected for reception of an incoming data packet, and configured to determine whether routing information contained in the incoming data packet relates to a link aggregation group having multiple output links associated therewith, and, if so, to provide a network route value for use in routing the data packet towards one of the output links associated with the link aggregation group and to provide a link aggregation group algorithm value based upon routing information; and
wherein the link aggregation group algorithm value is used to identify a link aggregation group algorithm for use by the packet processor and wherein the selected link aggregation group algorithm is subsequently used to generate a distribution value which is added to the internal packet header and which provides preferred distribution across the egress ports used to form the link aggregation group, and wherein the distribution value is used by the packet processor for determining the one of the output links for the incoming data packet to be routed upon.

20. An Ethernet switch as claimed in claim 19, wherein each switching element includes such a packet processor connected for reception of an incoming data packet, and configured to determine whether routing information contained in the incoming data packet relates to a link aggregation group having multiple output links associated therewith, and, if so, to route the data packet towards one of the output links associated with the link aggregation group.

21. The Ethernet switch of claim 19, wherein the selection of the link aggregation group algorithm is based upon a link aggregation algorithm value derived from the routing information, and is indicative of the link aggregation group algorithm to be used.

22. The Ethernet switch of claim 21 wherein the link aggregation group algorithm will use at least one of a source MAC address, a destination MAC address, a combination of the source MAC address and the Destination MAC address, a source IP number, a destination IP number or an IP port address to generate the distribution value.

23. A method of routing Ethernet data packets in an Ethernet switch having a data ingress port, a plurality of data egress ports having respective output links, and network fabric connecting the data ingress port with the data egress ports, and comprising a plurality of interconnected switching elements, the ingress port being connected to each of the output ports via a plurality of switching elements, the method comprising the steps of, in a plurality of the switching elements:
receiving an incoming data packet;
determining whether routing information contained in the incoming data packet relates to a link aggregation group having multiple egress ports associated therewith, and, if so, providing a network route value and a link aggregation group algorithm value based upon the routing information, the algorithm value used to identify a link aggregation group algorithm from a plurality of possible link aggregation group algorithms, and subsequently using the selected link aggregation group algorithm to generate a distribution value for the incoming data packet which is added to the header of an internal data packet, and routing the incoming data packet towards one of the output links associated with the link aggregation group, wherein the output link is selected based upon the distribution value and wherein the distribution value provides a predetermined distribution across the multiple egress ports making up the link aggregation group.

24. A method as claimed in claim 23, comprising the steps of, at each switching element:
receiving an incoming data packet;

determining whether routing information contained in the incoming data packet relates to a link aggregation group having multiple egress ports associated therewith, and, if so, determining a link aggregation group algorithm from the routing information, generating a distribution value for the incoming data packet and routing the incoming data packet towards one of the output links associated with the link aggregation group, wherein the output link is selected based upon the distribution value.

25. The method of claim 23 wherein the routing information of the incoming data packet is further used to generate a link aggregation algorithm value which is then used to select the link aggregation group algorithm.

26. The method of claim 25 wherein the used link aggregation group algorithm will use at least one of a source MAC address, a destination MAC address, a combination of the source MAC address and the Destination MAC address, a source IP number, a destination IP number or an IP port address to generate the distribution value.

\* \* \* \* \*